M. H. CRUISE.
SPRING WHEEL.
APPLICATION FILED OCT. 31, 1911.

1,060,823.

Patented May 6, 1913.

2 SHEETS—SHEET 1.

Witnesses
Carroll Bailey.
V. B. Hillyard.

Inventor
M. H. Cruise,
By Victor J. Evans
Attorney

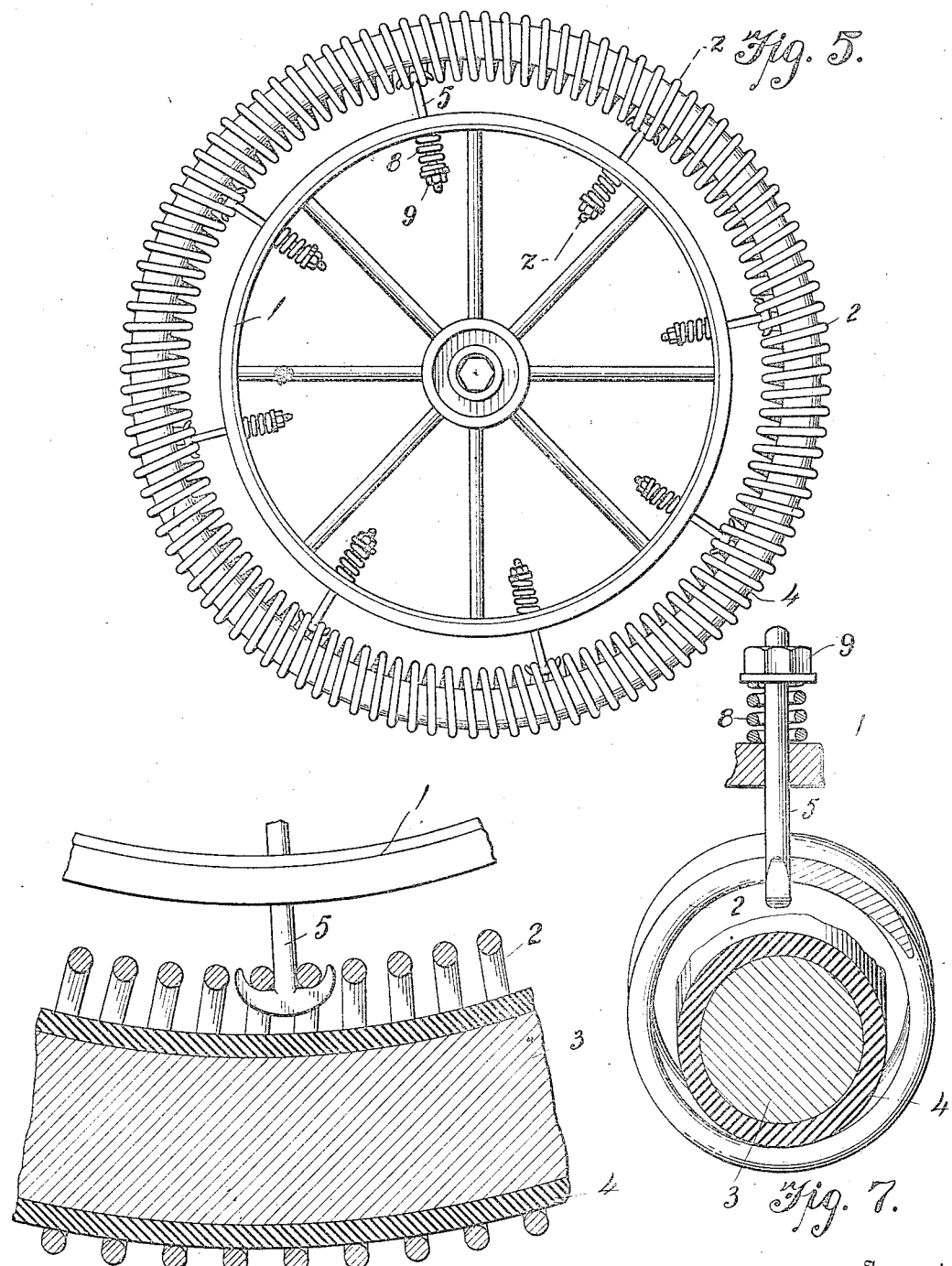

UNITED STATES PATENT OFFICE.

MICHAEL H. CRUISE, OF HEBRON, NEBRASKA.

SPRING-WHEEL.

1,060,823.  Specification of Letters Patent.   Patented May 6, 1913.

Application filed October 31, 1911. Serial No. 657,741.

*To all whom it may concern:*

Be it known that I, MICHAEL H. CRUISE, a citizen of the United States, residing at Hebron, in the county of Thayer and State of Nebraska, have invented new and useful Improvements in Spring-Wheels, of which the following is a specification.

The primary object of this invention is the provision of a tire for vehicle wheels which is resilient and practically proof against injury, the tire comprising a coil of wire reinforced by means of a sustaining core, said tire being connected to the rim of the wheel by fastening means such as hooked bolts, the latter being provided with nuts or burs whereby the tire may be tensioned to the proper degree.

The invention consists of the novel features, details of construction and combination of parts, which hereinafter will be more particularly set forth, illustrated in the accompanying drawings, and pointed out in the appended claims.

Figure 1:
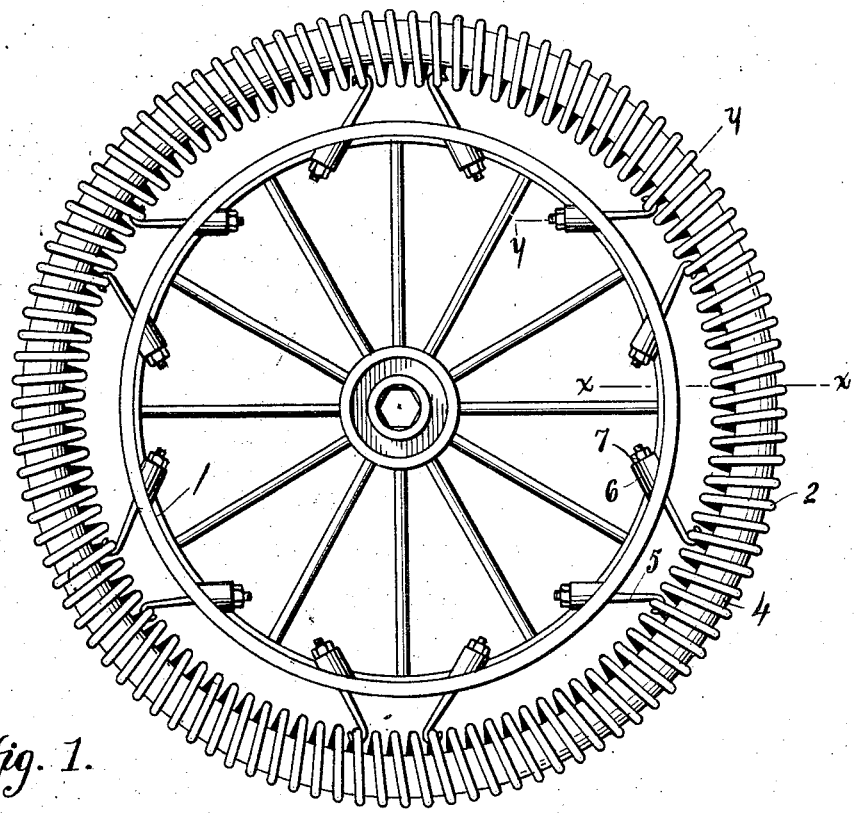
Figure 2:
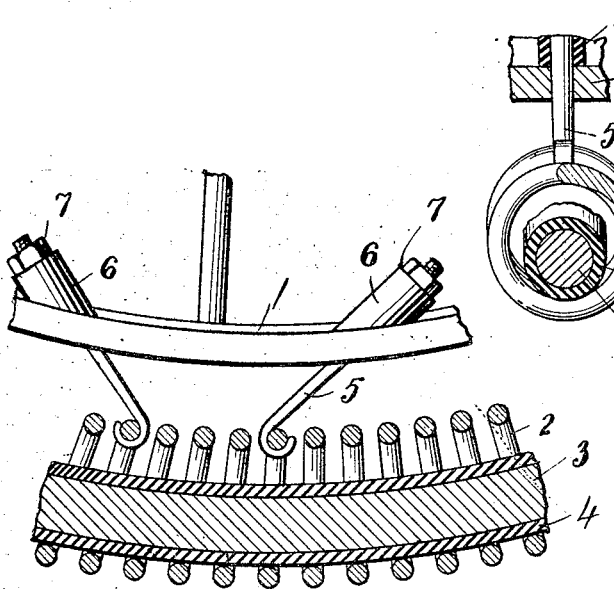
Figure 3:
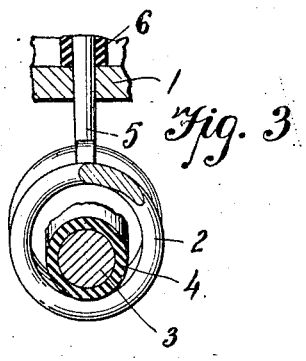
Figure 4:
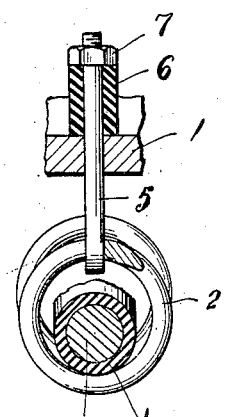

Referring to the drawings, forming a part of the specification, Figure 1 is a side view of a spring wheel embodying the invention. Fig. 2 is a sectional view of part of the outer portion of the wheel in the plane thereof, showing the parts on a larger scale. Fig. 3 is a section on the line $x$—$x$ of Fig. 1. Fig. 4 is a section on the line $y$—$y$ of Fig. 1. Fig. 5 is a view similar to Fig. 1 of a modification. Fig. 6 is a sectional view of part of the outer portion of the wheel in the plane thereof, showing the elements on a larger scale. Fig. 7 is a cross section on the line $z$—$z$ of Fig. 5.

Corresponding and like parts are referred to in the following description, and indicated in all the views of the drawings, by the same reference characters.

The wheel proper may be of any construction and comprises a rim 1 which is connected by means of spokes to the hub in the usual manner. The tire encircles the rim of the wheel and is spaced therefrom and comprises a wire coil 2 having a reinforcing ring 3 arranged within the coil to stiffen and reinforce the same. The reinforcing core 3 is of metal and slightly resilient and of a less diameter than the internal diameter of the wire coil and is covered by means of a casing 4 of rubber or like material, thereby preventing rattle and at the same time cushioning the blows between the core and coil. The coil 2 may be formed of spring wire of suitable gage wound upon itself in helical form. The wire coil may consist of one or any number of sections, the ends of which may be joined in any substantial manner. Hooked bolts 5 connect the wire coil 2 with the rim 1, the hooked ends of the bolts engaging volutes of the wire coil and the stems of said bolts passing through openings formed in the rim 1 and receiving washers 6 and nuts or burs 7. The washers 6 may be of rubber or other suitable material. In the form illustrated in Fig. 1 the bolts 5 are provided in pairs and are oppositely inclined. In the construction shown in Fig. 5 the bolts 5 have a radial arrangement and receive expansible springs 8 of the helical type, said springs being confined between the inner side of the rim 1 and nuts 9 mounted upon the inner threaded ends of the bolt. This arrangement adds to the resiliency of the tire.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In a vehicle wheel, the combination of a wire coil encircling the rim of the wheel and spaced therefrom, bolts having hooks at their outer ends engaging elements of the wire coil and having their inner portions passing loosely through openings formed in the rim of the wheel, yieldable elements mounted upon the inner ends of the bolts, and nuts threaded upon the bolts for confining said yieldable elements thereon and against the inner side of the rim of the wheel.

2. In a vehicle wheel, the combination of a wire coil encircling the rim of the wheel and spaced therefrom, an annular core arranged within the wire coil to stiffen and reinforce the same, bolts provided in pairs and having an opposite inclination, the outer ends of the bolts engaging elements of the wire coil and the inner ends of the bolts passing loosely through openings formed in the rim of the wheel and receiving nuts.

In testimony whereof I affix my signature in presence of two witnesses.

MICHAEL H. CRUISE.

Witnesses:
A. G. COLLINS,
R. S. PRYCE.